US008655728B1

(12) United States Patent
Catane et al.

(10) Patent No.: US 8,655,728 B1
(45) Date of Patent: Feb. 18, 2014

(54) SYSTEM, METHOD, AND COMPUTER PROGRAM FOR PRESENTING A NON-COMPETING ADVERTISEMENT WITH CONTENT

(75) Inventors: Avishai Catane, Bet Shemesh (IL); Eric Danis, Modi'in (IL); Eyal Chen, Kfar Saba (IL)

(73) Assignee: Amdocs Software Systems Limited, Dublin (IE)

( * ) Notice: Subject to any disclaimer, the term of this patent is extended or adjusted under 35 U.S.C. 154(b) by 608 days.

(21) Appl. No.: 12/120,036

(22) Filed: May 13, 2008

(51) Int. Cl.
*G06Q 40/00* (2012.01)
(52) U.S. Cl.
USPC ........................................ 705/14.64
(58) Field of Classification Search
USPC ................................. 705/14, 14.64
See application file for complete search history.

(56) References Cited

U.S. PATENT DOCUMENTS

| | | | |
|---|---|---|---|
| 7,725,502 B1* | 5/2010 | Badros et al. | 705/14.73 |
| 2002/0103698 A1* | 8/2002 | Cantrell | 705/14 |
| 2002/0147637 A1* | 10/2002 | Kraft et al. | 705/14 |
| 2005/0075946 A1* | 4/2005 | Henning et al. | 705/26 |
| 2006/0095322 A1* | 5/2006 | Dierks | 705/14 |
| 2007/0055569 A1* | 3/2007 | Subramanian et al. | 705/14 |
| 2007/0150353 A1 | 6/2007 | Krassner et al. | 705/14 |
| 2007/0255622 A1 | 11/2007 | Swix et al. | 705/14 |

OTHER PUBLICATIONS

"AdSense: Maximizing Revenue," Your Friend Alfred, Dec. 15, 2006 http://yourfriendalfred.blogspot.com/2006/12/adsense-maximizing-revenue.html.

* cited by examiner

*Primary Examiner* — Hani M Kazimi
*Assistant Examiner* — Hatem M Ali
(74) *Attorney, Agent, or Firm* — Zilka-Kotab, PC (57) ABSTRACT

A system, method, and computer program product are provided for presenting a non-competing advertisement within content. In use, content is identified. Further, an advertisement is selected based on an automatic determination that the advertisement is non-competing with the content. Still yet, the advertisement is presented in association with the content.

22 Claims, 6 Drawing Sheets

SYSTEM, METHOD, AND COMPUTER PROGRAM FOR PRESENTING A NON-COMPETING ADVERTISEMENT WITH CONTENT

FIELD OF THE INVENTION

The present invention relates to advertising, and more particularly to presenting advertisements.

BACKGROUND

Advertising has traditionally been utilized for promoting a good and/or service. However, the context in which advertisements are digitally presented has generally been limited. For example, advertisements have customarily been excluded from presentation within other hosting advertisements, for ensuring that even potential competition between the advertisements and the hosting advertisements is avoided.

There is thus a need for addressing these and/or other issues associated with the prior art.

SUMMARY

A system, method, and computer program product are provided for presenting a non-competing advertisement within content. In use, content is identified. Further, an advertisement is selected based on an automatic determination that the advertisement is non-competing with the content. Still yet, the advertisement is presented in association with the content.

DETAILED DESCRIPTION

Figure 1:
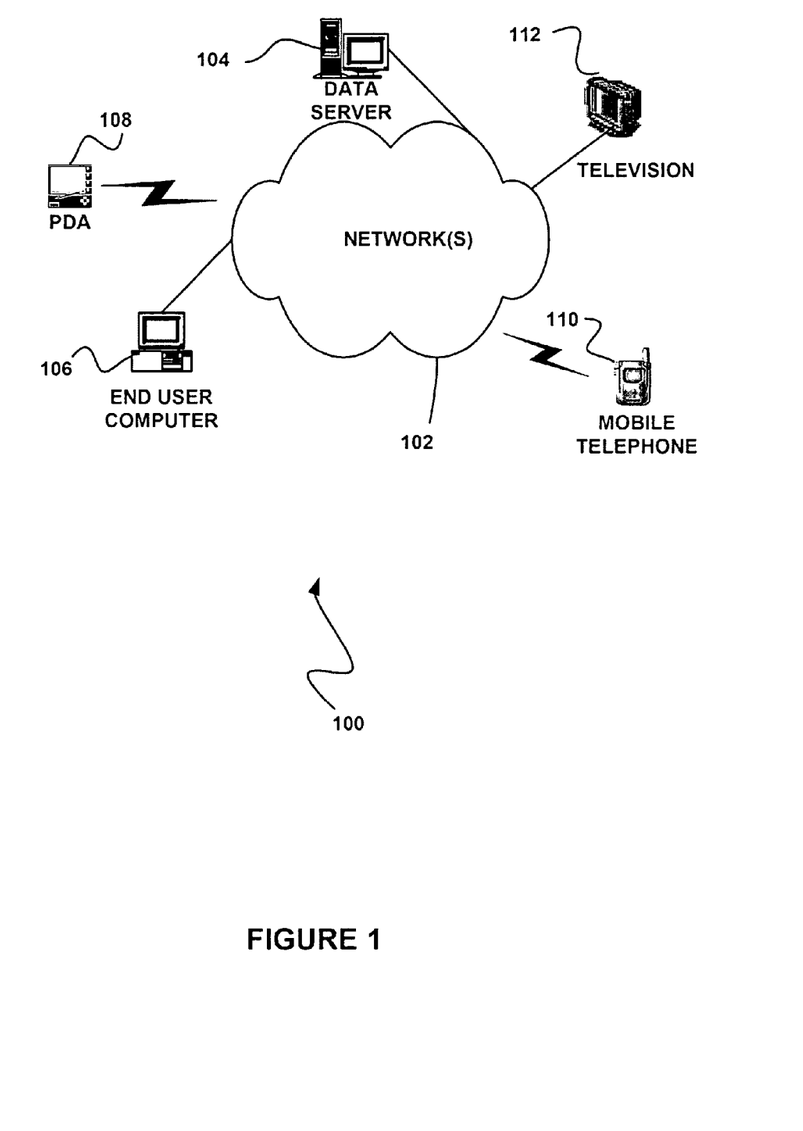
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
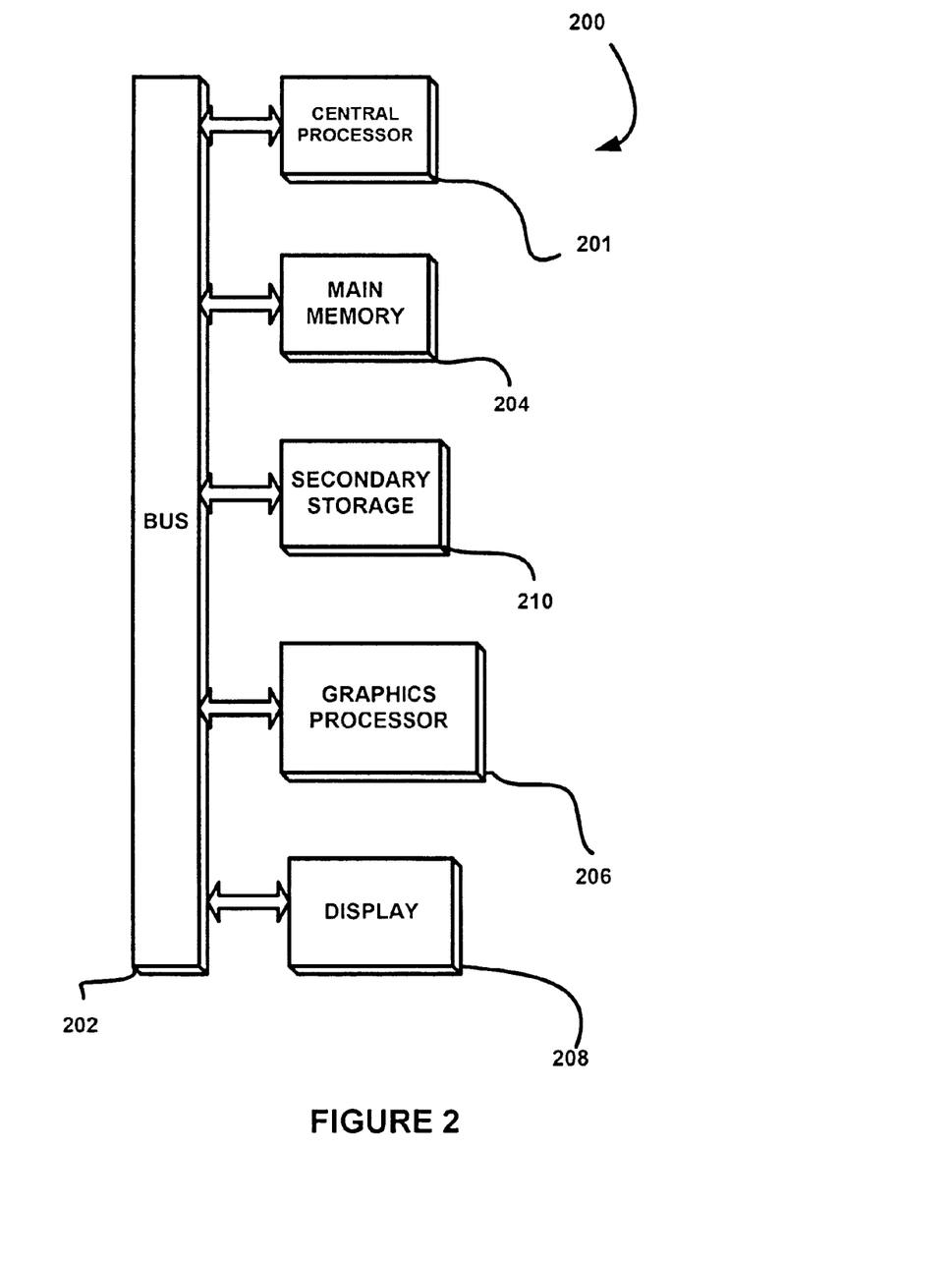
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
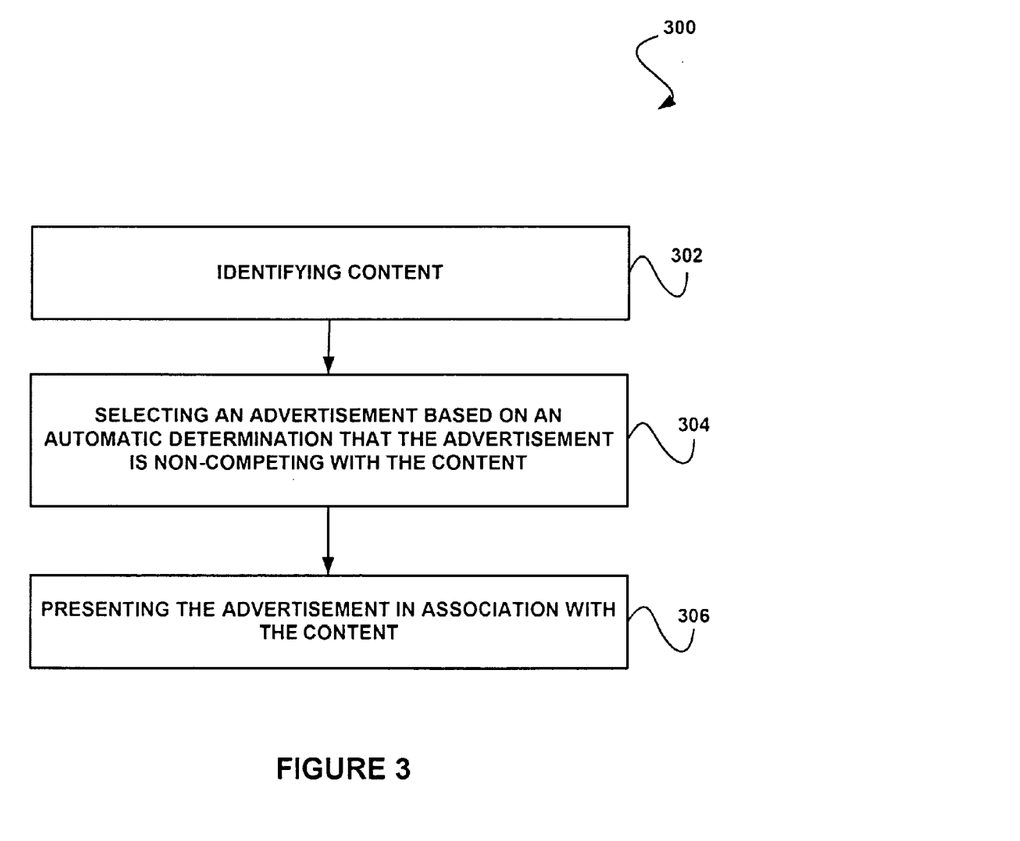
FIG. 3 shows a method for presenting a non-competing advertisement within content, in accordance with one embodiment.

FIG. 3 shows a method 300 for presenting a non-competing advertisement within content, in accordance with one embodiment. As an option, the method 300 may be carried out in the context of the details of FIGS. 1 and/or 2. Of course, however, the method 300 may be carried out in any desired environment.

As shown in operation 302, content is identified. With respect to the present description, the content may include any type of data capable of being presented in association with an advertisement. For example, the content may include a web page.

In one embodiment, the content may advertise a good and/or a service. Thus, the content may be an advertisement. In another embodiment, the content may be published by any type of entity (i.e. publisher), such as an advertiser.

As an option, the content may be identified in response to a request by the publisher for the content to be presented with an associated advertisement. Just by way of example, the publisher may be compensated for allowing an advertisement to be presented in association with the content. The compensation may be in the form of a monetary compensation, a credit toward presenting advertisements of the publisher, etc.

As another example, a cost for the content to be presented (e.g. via a web server, etc.) may be reduced in exchange for allowing the advertisement to be presented in association with the content. Of course, it should be noted that the content may be identified in any desired manner.

Additionally, as shown in operation 304, an advertisement is selected based on an automatic determination that the advertisement is non-competing with the content. With respect to the present description, the selected advertisement may include any advertisement that is capable of being presented in association with the content. For example, the advertisement may include a banner and/or data in any other format that advertises a good and/or service.

In one embodiment, the advertisement may be selected from a plurality of advertisements. Just by way of example, a database may store a plurality of advertisements. To this end, an advertisement that is non-competing with the content may optionally be selected from the database.

Furthermore, the advertisement may be non-competing with the content if information associated with the advertisement (e.g. a product and/or service advertised by the advertisement, etc.) does not include market competition for information associated with the content. The market competition may include any market in which a good and/or service is provided in competition with another good and/or service (e.g. competing goods and/or services that are utilized for the same purpose, etc.).

In one embodiment, the advertisement may be non-competing with the content if a category of the advertisement is non-competing with any one or more categories of the content. The category of the advertisement may optionally include a category of the product and/or service advertised. In another embodiment, the category of the content may optionally include a category of information included in the content (e.g. a product and/or service advertised via the content, etc.).

Accordingly, the automatic determination that the advertisement is non-competing with the content may include comparing the category of the content with the category of the advertisement. For example, the advertisement may be non-competing with the content if the category of the content is determined to be non-competing with the category of the advertisement, based on the comparison (e.g. the category of the advertisement and the category of the content do not match). In one exemplary embodiment, an advertisement for an automobile security system (e.g. alarm) may be non-competing with content associated with a used car dealer.

In another embodiment, the automatic determination that the advertisement is non-competing with the content may include determining that the category of the advertisement is not included in a predetermined list of competing categories. The list of competing categories may be predetermined for (e.g. specific to, etc.) the category of the content, as an option. As another option, the list of competing categories may be predetermined for a heading (e.g. at lest one keyword, etc.) associated with the content.

In still yet another embodiment, the automatic determination that the advertisement is non-competing with the content may include identifying a set of categories of other content (e.g. other web pages, etc.) produced by (e.g. published by, etc.) the publisher of the content. The automatic determination may further include determining that the category of the advertisement is non-competing with the categories in the set of categories. In this way, it may be ensured that the advertisement does not compete with any content produced by the publisher.

In even yet another embodiment, the automatic determination that the advertisement is non-competing with the content may include identifying a set of categories of other advertisements produced by a publisher of the advertisement. In addition, the automatic determination may include comparing such set of categories with the category of the content. The advertisement may accordingly be determined to be non-competing with the content if each of the categories in the set of categories is determined to be non-competing with the category of the content, based on the comparison.

Of course, while various embodiments of performing the automatic determination that the advertisement is non-competing with the content have been described above, it should be noted that determination may be performed in any manner that is automatic (e.g. exclusive of user input, etc.). For example, as described above, a category of the advertisement and a category of the content may be utilized for determining that the advertisement is non-competing with the content.

Such categories may be identified automatically based on keywords included in the advertisement and content respectively, or in any other desired manner.

Moreover, as shown in operation 306, the advertisement is presented in association with the content. Thus, in one embodiment, the content and advertisement may be presented in conjunction. Just by way of example, the presentation may include displaying the content and advertisement on a display device (e.g. a display of any of the devices described above with respect to FIGS. 1 and/or 2).

As an option, the advertisement may be presented in association with the content by being embedded in the content. As another option, the advertisement may be presented in association with the content by being presented via a banner of the content. Of course, however, the advertisement may be presented in association with the content in any desired manner.

To this end, it may be automatically ensured that any advertisement presented in association with content is non-competing with the content. As an option, it may also be automatically ensured that any advertisement presented in association with content is non-competing any other content produced by a publisher of the content, such that the advertisement does not compete with any good and/or service advertised by the publisher of the content. For example, if the content includes an advertisement, it may be automatically ensured that another advertisement presented in association therewith is non-competing.

As a further option, the non-competing advertisement may also be selected based on an automatic determination that the advertisement is relevant to the content. For example, it may be automatically determined that the category of the advertisement is relevant to (e.g. related to, etc.) a category of the content. As another example, it may be automatically determined that the category of the advertisement is included in a predetermined list of complementing categories.

Such list of complementing categories may be predetermined for the category of the content, as an option. As another option, the list of complementing categories may be predetermined for a heading associated with the content. As yet another option, the predetermined list of complementing categories may include a fixed set of categories predetermined (e.g. preconfigured by a publisher of a directory in which the content is included, etc.) to be relevant. In this way, it may be automatically ensured that any advertisement presented in association with content is non-competing with the content and relevant to the content, in one embodiment.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
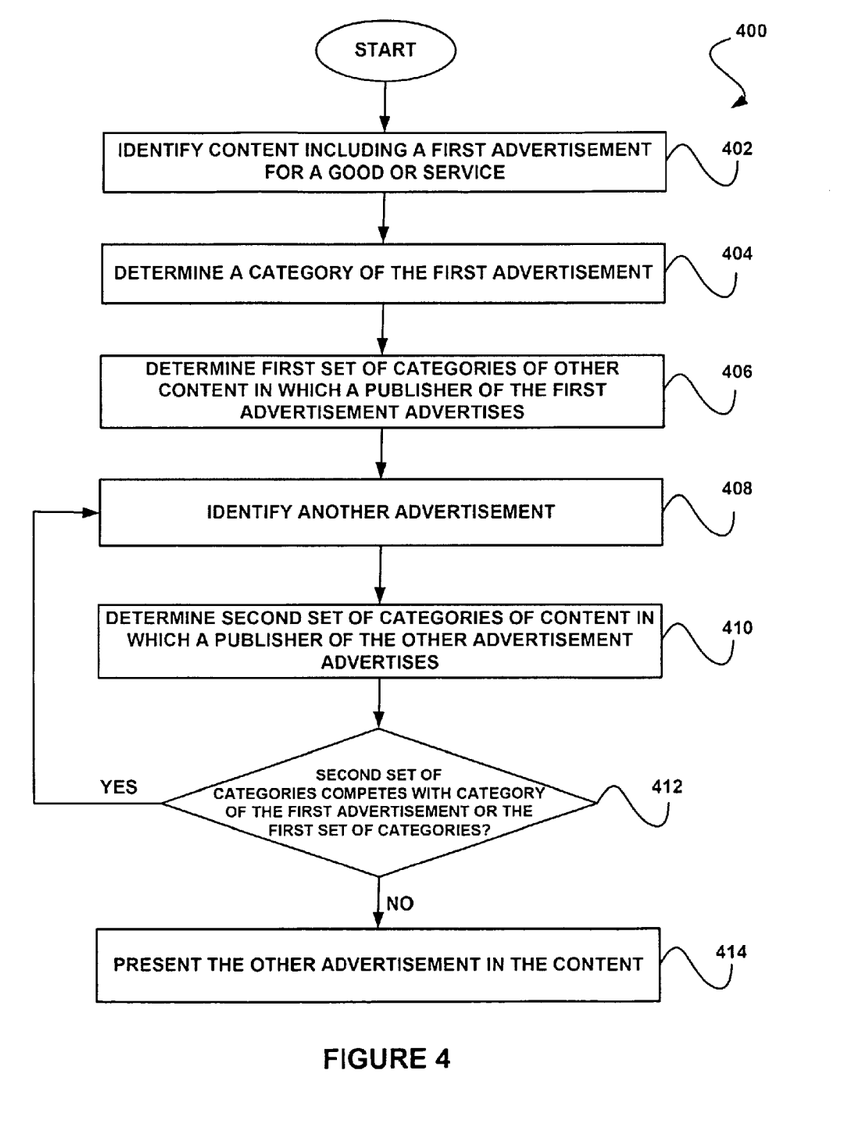
FIG. 4 shows a method for determining whether an advertisement competes with content, in accordance with another embodiment.

FIG. 4 shows a method 400 for determining whether an advertisement competes with content, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, content that includes a first advertisement for a good or service is identified. With respect to the present embodiment, the content may be a webpage advertising the good or service. Thus, the content may be produced by an advertiser of the good or service for presenting such advertisement.

Additionally, a category of the first advertisement is determined, as shown in operation 404. In one embodiment, the category of the first advertisement may be determined based on a heading associated with the first advertisement. For example, keywords may be extracted from the first advertisement. Such keywords may then be utilized for determining the category of the first advertisement (e.g. by matching the keywords to predetermined keywords associated with the category, etc.).

Further, as shown in operation 406, a first set of categories of other content in which a publisher of the first advertisement advertises is determined. Thus, the other content may include any other content via which the publisher advertises (e.g. content produced by the publisher, content with which an advertisement of the publisher is associated for presentation purposes, etc.). In addition, a category of each of such other content may be collected for determining the first set of categories. To this end, all categories of content via which the publisher advertises may be identified.

Moreover, another advertisement is identified, as shown in operation 408. The other advertisement may include any advertisement that is different from the first advertisement. For example, the other advertisement may be produced by another publisher different from the publisher of the content that includes the first advertisement. As an option, the other advertisement may be identified from a database of advertisements.

Still yet, a second set of categories of content in which the other publisher of the other advertisement advertises is determined. Note operation 410. Accordingly, categories of content via which the other publisher advertises may be determined. The content may include content produced by the other publisher, content with which an advertisement of the other publisher is associated for presentation purposes, etc.

As shown in decision 412, it is determined whether the second set of categories competes with the category of the first advertisement or the first set of categories. For example, it may be determined whether any of the categories in the second set of categories competes with the category of the first advertisement or any of the categories in the first set of categories. In this way, it may be determined whether the other advertisement (identified in operation 408) competes with the content (identified in operation 402) or any other content associated with the publisher of such content.

If it is determined that the other advertisement does not compete with the category of the first advertisement or the first set of categories, the other advertisement is presented in the content. Note operation 414. Just by way of example, the other advertisement may be embedded in the content. If, however, it is determined that the other advertisement does compete with the category of the first advertisement or the first set of categories, yet another advertisement is identified (operation 408). Accordingly, the method 400 may continue until a non-competing advertisement is identified for presentation in the content.

Figure 5:
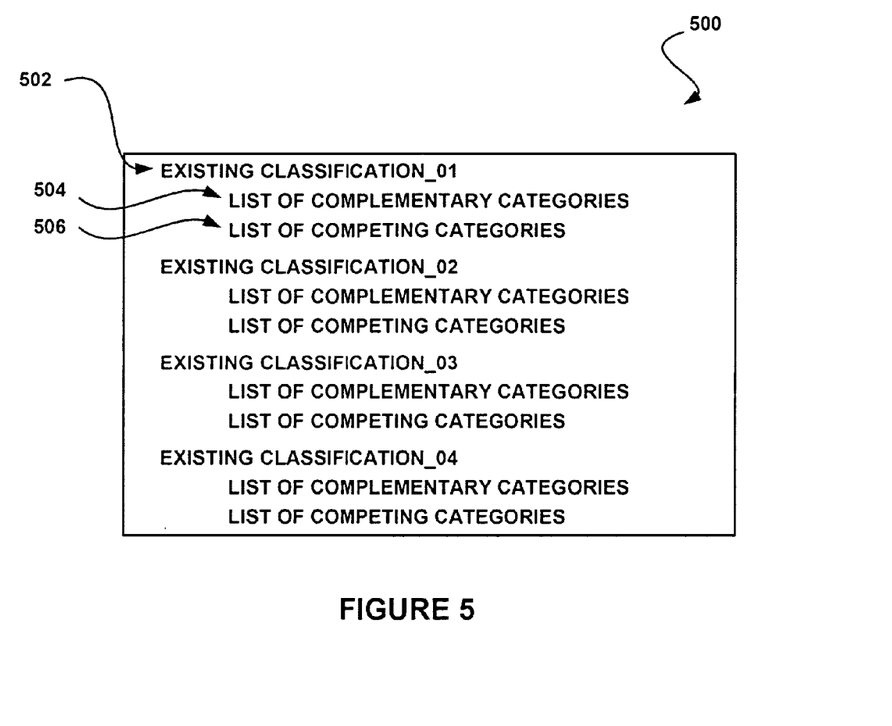
FIG. 5 shows a data structure storing complementary and competing categories associated with each of a plurality of headings, in accordance with yet another embodiment.

FIG. 5 shows a data structure 500 storing complementary and competing categories associated with each of a plurality of headings, in accordance with yet another embodiment. As an option, the data structure 500 may be implemented in the context of the details of FIGS. 1-4. Of course, however, the data structure 500 may be implemented in any desired environment. Again, the aforementioned definitions may equally apply to the description below.

As shown, the data structure 500 includes a plurality of existing classifications 502 (i.e. existing classification_01, existing classification_02, etc.). The existing classifications 502 may each include a different category (e.g. heading) with which content and/or an advertisement may be associated. Thus, a first one of the existing classifications 502 may be associated with a first category, a second one of the existing classifications 502 may be associated with a second category, and so forth.

As an option, each of the existing classifications 502 may include at least one keyword. Thus, content and/or advertisements including a keyword included in a particular category may be categorized according to such category. As another option, content and/or advertisements including multiple keywords spanning multiple existing classifications 502 may be categorized according to the categories associated with such existing classifications 502. In this way, content and/or advertisements may optionally each be associated with multiple categories.

As also shown, each of the existing classifications 502 is associated with a predetermined list of complementary categories 504. The predetermined list of complementary categories 504 may include at least one category of content and/or advertisements determined to be relevant to the existing classifications 502. Thus, an advertisement categorized according to one of the complementary categories in the predetermined list of complementary categories 504 for one of the existing classifications 502 may be automatically determined to be relevant to content associated with such existing classification 502 (e.g. categorized under the existing classification 502, etc.)

Further, each of the existing classifications 502 is associated with a predetermined list of competing categories 506. The predetermined list of competing categories 506 may include at least one category of content and/or advertisements determined to be competition for the existing classifications 502. To this end, an advertisement categorized according to one of the competing categories in the predetermined list of competing categories 506 for one of the existing classifications 502 may be automatically determined to be in competition with content associated with such existing classification 502 (e.g. categorized under the existing classification 502, etc.).

The list of complementary categories 504 and the list of competing categories 506 associated with each of the existing classifications 502 may be predetermined for such existing classifications 502. For example, the list of complementary categories 504 and the list of competing categories 506 associated with each of the existing classifications 502 may be predetermined by a publisher of a directory service via which the content and/or advertisements are presented. Accordingly, each of the existing classifications 502 may be associated with a different list of complementary categories 504 and a different list of competing categories 506.

As an option, the list of complementary categories 504 and the list of competing categories 506 may be periodically updated. For example, the list of complementary categories 504 and/or the list of competing categories 506 may be updated in response to identification of a new category of content and/or advertisements. To this end, in one embodiment, the data structure 500 may be utilized for automatically selecting an advertisement that is non-competing with and relevant to content, such that the advertisement may be presented in association with the content.

Figure 6:
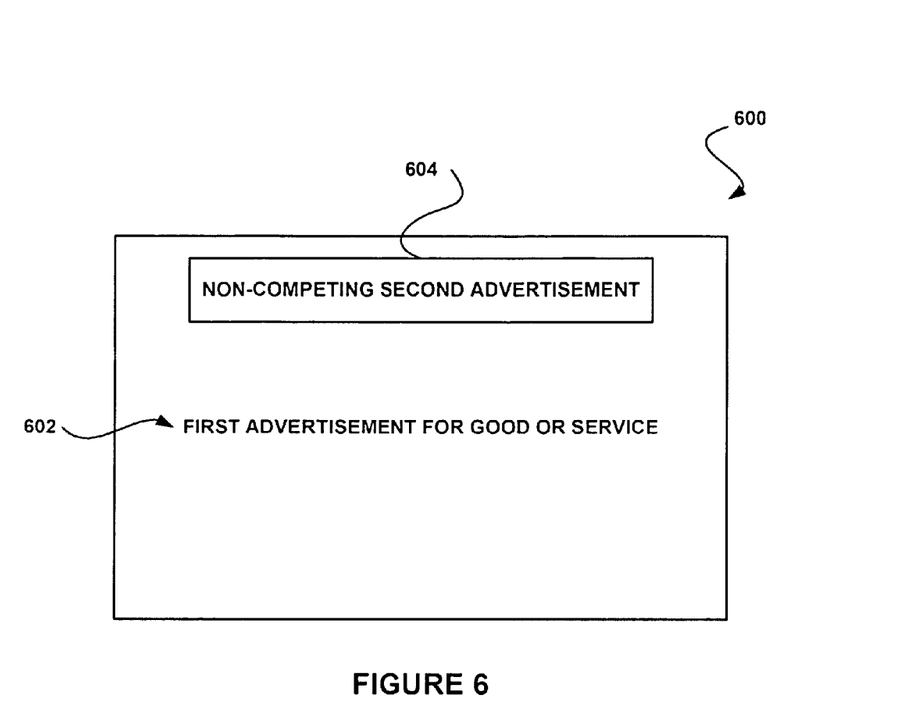
FIG. 6 shows a graphical user interface for presenting a non-competing first advertisement in association with a second advertisement, in accordance with still yet another embodiment.

FIG. 6 shows a graphical user interface (GUI) 600 for presenting a non-competing first advertisement in association with a second advertisement, in accordance with still yet another embodiment. As an option, the GUI 600 may be implemented in the context of the details of FIGS. 1-5. Of course, however, the GUI 600 may be implemented in any desired environment. Yet again, the aforementioned definitions may equally apply to the description below.

As shown, the GUI 600 is utilized for displaying a first advertisement for a good or service. In one embodiment, the GUI 600 may display a web page of the first advertisement. It should be noted that the GUI 600 may be displayed utilizing any display device of any of the devices described above with respect to FIGS. 1 and/or 2.

The GUI 600 also includes a banner 604 for displaying a non-competing second advertisement. As an option, the second advertisement may also include an advertisement determined to be relevant to the first advertisement. Accordingly, a non-competing, relevant second advertisement may be presented in association with the first advertisement.

In one embodiment, the banner 604 may be selectable. For example, a user may select the banner 604 for navigating to a web page associated with the second advertisement. Such web page may be published by a publisher of the second advertisement, as an option.

Upon selection of the banner 604, the publisher of the second advertisement (e.g. the advertiser), a record of such selection may be logged. Furthermore, the publisher of the second advertisement may be charged for the presentation of the second advertisement via the banner 604 (e.g. in response to each selection of the banner 604 by a user, etc.). As another option, the logging of the selection of the banner 604 may be utilized for generating statistics associated with the second advertisement (e.g. a rate of selection of the banner 604, etc.). Such statistics may be displayed to the publisher of the second advertisement as another option.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer program product embodied on a tangible computer readable medium, comprising:
    computer code for identifying content, the content including a web page produced by a publisher of the content;
    computer code for identifying a set of categories of additional content including other web pages produced by the publisher of the content;
    computer code for determining a list of competing categories for the content, where the list includes at least one category of content or advertisement determined to be competition for the identified content;
    computer code for selecting an advertisement response to:
    determination that the advertisement is non-competing with the content, the determination including determining that a category of the advertisement is not included in the list of competing categories for the content, and
    a determination that the category of the advertisement is non-competing with the categories in the set of categories of the additional content produced by the publisher of the content; and
    computer code for presenting the selected advertisement in association with the content, such that the selected advertisement does not compete with the content, and the selected advertisement does not compete with the other web pages produced by the publisher of the content.

2. The non-transitory computer program product of claim 1, wherein the content advertises at least one of a good and a service.

3. The non-transitory computer program product of claim 1, wherein the advertisement is selected from a plurality of advertisements.

4. The non-transitory computer program product of claim 1, wherein the list of competing categories is specific to a category of the content.

5. The non-transitory computer program product of claim 1, wherein the list of competing categories is specific to a heading associated with the content.

6. The non-transitory computer program product of claim 5, wherein the heading includes at least one keyword.

7. The non-transitory computer program product of claim 6, wherein the at least one keyword is matched to predetermined keywords associated with a category of the content.

8. The non-transitory computer program product of claim 1, wherein presenting the selected advertisement in association with the content includes embedding the advertisement in the content.

9. The non-transitory computer program product of claim 1, wherein presenting tile selected advertisement in association with tile content includes presenting the advertisement via a banner of tile content.

10. The non-transitory computer program product of claim 1, wherein tile advertisement is determined to be non-competing with the content if information associated with the advertisement does not include market competition for information associated with the content.

11. The non-transitory computer program product of claim 10, wherein tile market competition includes any market in which at least one of a good and a service is provided in competition with another of at least one of a good and a service.

12. The non-transitory computer program product of claim 1, wherein the category of the advertisement is determined based on a heading associated with the advertisement.

13. The non-transitory computer program product of claim 1, wherein a cost for the content to be presented is reduced in exchange for allowing the advertisement to be presented in association with the content.

14. The non-transitory computer program product of claim 1, wherein the list of competing categories is associated with classification of the content within a data structure, where the content is associated with the classification based on a keyword included within the content.

15. The non-transitory computer program product of claim 14, wherein the list of competing categories is updated within the data structure in response to an identification of a new category of one or more of content and advertisements.

16. The non-transitory computer program product of claim 1, wherein each of a plurality of different categories of advertisement is associated with a different predetermined list of complementary categories, and wherein the selection of the advertisement is further in response to a determination that the category of the advertisement is included in a predetermined list of complementary categories of the content.

17. The non-transitory computer program product of claim 1, further including:
    identifying a second advertisement different from the selected advertisement, wherein the second advertisement is produced by a second publisher different from the publisher of the content presented in association with the selected advertisement, identifying a second set of categories of content associated with the second publisher of the second advertisement, and
    determining whether any categories in the second set of categories competes with the category of the advertisement and tire set of categories of the additional content produced by the publisher of the content.

18. The non-transitory computer program product of claim 17, wherein in response to a determination that no categories in the second set of categories competes with the category of the advertisement and the set of categories of the additional content produced by the publisher of the content, presenting the second advertisement with the content and tire first advertisement.

19. The non-transitory computer program product of claim 1, wherein the determination that the category of the advertisement is non-competing with the categories in the set of categories of the additional content includes identifying a set of categories of other advertisements produced by a publisher of the advertisement, and comparing the set of categories of other advertisements produced by the publisher of the advertisement with a category of the content.

20. A method, comprising:
    identifying content, the content including a web page produced by a publisher of the content;
    identifying a set of categories of additional content including other web pages produced by the publisher of the content;
    determining a list of competing categories for the content, where the list includes at least one category of content or advertisement determined to be competition for the identified content;
    selecting, utilizing a processor, an advertisement in response to:
    determination that the advertisement is non-competing with the content, the determination including determining that a category of the advertisement is not included in the list of competing categories for the content, and
    a determination that the category of the advertisement is non-competing with the categories in the set of categories of the additional content produced by the publisher of the content: and
    presenting the selected advertisement in association with the content, such that the selected advertisement does not compete with the content, and the selected advertisement does not compete with the other web pages produced by the publisher of the content.

21. A system, comprising:
    a processor configured to:
        identify content, the content including a web page produced by a publisher of the content,
        identify a set of categories of additional content including other web pages produced by the publisher of the content,
        determine a list of competing categories for the content, where the list includes at least one category of content or advertisement determined to be competition for the identified content,
        select an advertisement in response to:
            a determination that the advertisement is non-competing with the content, the determination including determining that a category of the advertisement is not included in the list of competing categories for the content, and
            a determination that the category of the advertisement is non-competing with the categories in the set of categories of the additional content produced by the publisher of the content, and
        present the selected advertisement in association with the content, such that the selected advertisement does not compete with the content, and the selected advertisement does not compete with the other web pages produced by the publisher of the content.

22. The system of claim 21; wherein the processor coupled to memory via a bus.

* * * * *